US012570810B2

(12) United States Patent
Odawara et al.

(10) Patent No.: US 12,570,810 B2
(45) Date of Patent: Mar. 10, 2026

(54) LONG FIBER-REINFORCED PROPYLENE RESIN COMPOSITION AND LONG FIBER-REINFORCED MOLDED PRODUCT

(71) Applicant: PRIME POLYMER CO., LTD., Tokyo (JP)

(72) Inventors: Akiko Odawara, Kisarazu (JP); Yurie Kumeda, Sodegaura (JP)

(73) Assignee: PRIME POLYMER CO., LTD., Tokyo (JP)

( * ) Notice: Subject to any disclaimer, the term of this patent is extended or adjusted under 35 U.S.C. 154(b) by 1352 days.

(21) Appl. No.: 17/289,419

(22) PCT Filed: Nov. 1, 2019

(86) PCT No.: PCT/JP2019/043049
§ 371 (c)(1),
(2) Date: Apr. 28, 2021

(87) PCT Pub. No.: WO2020/091051
PCT Pub. Date: May 7, 2020

(65) Prior Publication Data
US 2021/0347954 A1 Nov. 11, 2021

(30) Foreign Application Priority Data

Nov. 2, 2018 (JP) ................................. 2018-207293
Mar. 29, 2019 (JP) ................................. 2019-066856

(51) Int. Cl.
*C08F 222/06* (2006.01)
*C08J 3/12* (2006.01)
(Continued)

(52) U.S. Cl.
CPC ............. *C08J 5/043* (2013.01); *C08F 222/06* (2013.01); *C08J 3/12* (2013.01); *C08J 5/244* (2021.05);
(Continued)

(58) Field of Classification Search
CPC .... C08J 5/043; C08J 5/244; C08J 3/12; C08F 222/06; C08K 3/04; C08L 23/06;
(Continued)

(56) References Cited

U.S. PATENT DOCUMENTS 9,359,492 B2 6/2016 Goda et al.
10,336,869 B2 7/2019 Fujita et al.
(Continued)

FOREIGN PATENT DOCUMENTS

CN 107148445 A * 9/2017 .......... C08L 23/0815
JP H03-183531 A 8/1991
(Continued)

OTHER PUBLICATIONS

Hamada, F., "Melting of Crystalline Polymers", Kobunshi, 1967, vol. 16, No. 6 (183), pp. 694-706. (26 pages). Machine Translation.
(Continued)

*Primary Examiner* — Joseph S Del Sole
*Assistant Examiner* — Ronald Grinsted
(74) *Attorney, Agent, or Firm* — Foley & Lardner LLP

(57) ABSTRACT

A long fiber-reinforced propylene resin composition, including a long fiber-reinforced resin pellet; an ethylene polymer that has a density of 865 to 950 kg/m³, a melting point of 50 to 105° C., and a heat of fusion of 52 J/g or more and is optionally modified; and optionally, a propylene polymer, wherein the long fiber-reinforced resin pellet is a pellet including a propylene polymer, a reinforcing fiber, and a modified polypropylene.

11 Claims, 1 Drawing Sheet

(51) Int. Cl.

| | |
|---|---|
| *C08J 5/04* | (2006.01) |
| *C08J 5/24* | (2006.01) |
| *C08K 3/04* | (2006.01) |
| *C08L 23/06* | (2006.01) |
| *C08L 23/12* | (2006.01) |
| *C08L 23/14* | (2006.01) |
| *C08L 23/16* | (2006.01) |
| *C08L 23/26* | (2025.01) |
| *C08L 53/00* | (2006.01) |

(52) U.S. Cl.

CPC ................ *C08K 3/04* (2013.01); *C08L 23/06* (2013.01); *C08L 23/12* (2013.01); *C08L 23/142* (2013.01); *C08L 23/16* (2013.01); *C08L 23/26* (2013.01); *C08L 53/00* (2013.01); *C08L 2205/03* (2013.01)

(58) Field of Classification Search

CPC ........ C08L 23/12; C08L 23/142; C08L 23/16; C08L 23/26; C08L 53/00; C08L 2205/03

USPC ........................................................ 524/494

See application file for complete search history.

(56) References Cited

U.S. PATENT DOCUMENTS

| | | |
|---|---|---|
| 10,858,507 B2 | 12/2020 | Matsuda |
| 2011/0040022 A1 | 2/2011 | Goda et al. |
| 2016/0237269 A1 | 8/2016 | Goda et al. |
| 2017/0321019 A1 | 11/2017 | Fujita et al. |
| 2018/0208725 A1* | 7/2018 | Lakeman ................... C08J 5/10 |
| 2019/0144651 A1 | 5/2019 | Matsuda |

FOREIGN PATENT DOCUMENTS

| | | |
|---|---|---|
| JP | H04-298553 A | 10/1992 |
| JP | H11-129246 A | 5/1999 |
| JP | 2010-106262 A | 5/2010 |
| WO | WO-2009/116608 A1 | 9/2009 |
| WO | WO-2015/002217 A1 | 1/2015 |
| WO | WO-2017/195787 A1 | 11/2017 |

OTHER PUBLICATIONS

Matsuyama, S., "Special Feature: General Overview of Polyethylene Geomembranes", Geosynthetic Technical Information, 1996, vol. 12, No. 3, pp. 32-37. (13 pages). Machine Translation.

Sato, Y., "Differential Scanning Calorimeters (DSC)" Aichi-Ken News, Oct. 2011, No. 115, p. 5. (4 pages). Machine Translation.

* cited by examiner

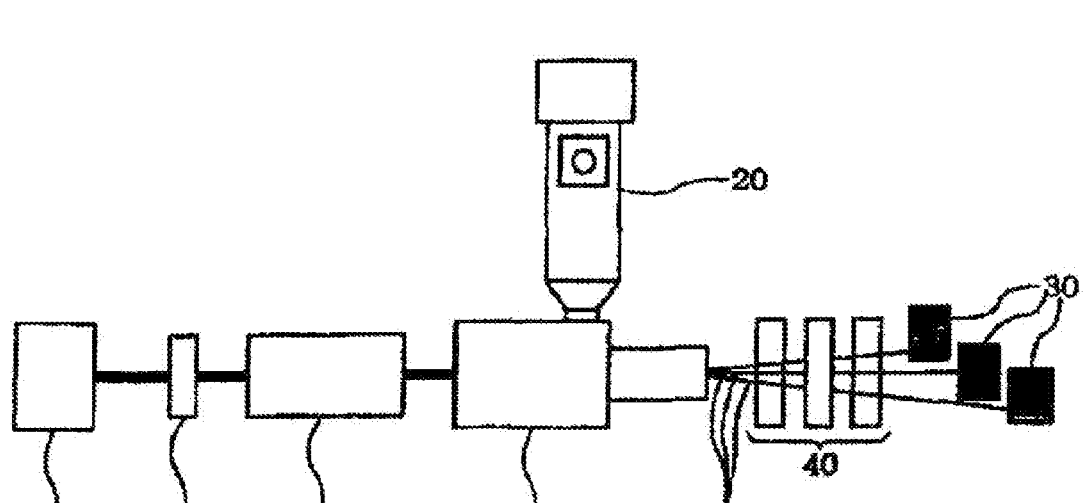

LONG FIBER-REINFORCED PROPYLENE RESIN COMPOSITION AND LONG FIBER-REINFORCED MOLDED PRODUCT

CROSS-REFERENCE TO RELATED APPLICATIONS

The present application claims priority under 37 U.S.C. § 371 to International Patent Application No. PCT/JP2019/043049, filed Nov. 1, 2019, which claims priority to and the benefit of Japanese Patent Application Nos. 2018-207293, filed on Nov. 2, 2018, and 2019-066856, filed on Mar. 29, 2019. The contents of these applications are hereby incorporated by reference in their entireties.

TECHNICAL FIELD

The present invention relates to a long fiber-reinforced propylene resin composition and a long fiber-reinforced molded product.

BACKGROUND ART

A fiber-reinforced resin molded product is lightweight and has excellent rigidity and heat resistance, and thus, is used in various fields such as electrical apparatus, automobiles, housing equipment, and medical apparatus.

As the fiber-reinforced resin molded product, for example, a molded product including a reinforcing fiber such as a glass fiber and a thermoplastic resin such as polyamide and polypropylene is known. Such a fiber-reinforced resin molded product is used for members that require high rigidity and heat resistance such as fan shrouds and propeller fans in engine rooms in the field of automobiles.

However, when a fiber-reinforced propylene resin composition including a reinforcing fiber such as a glass fiber is used for molding, irregularities are generated on the surface of the obtained molded product due to floating of the reinforcing fiber, resulting in poor appearance. In view of these problems, in Patent Literature 1, it is described that the heat resistance and mechanical properties of the molded product, and the appearance of the surface of the molded product are improved in a balanced manner by adjusting the relationship between the amount of the structural unit derived from the comonomer and the stereoregularity of a propylene polymer used in the fiber-reinforced propylene resin composition. The fiber-reinforced propylene resin composition can further include an acid-modified polypropylene, an impact resistance improver (such as an ethylene polymer) and the like.

Patent Literature 2 discloses a rear grip for a motorcycle having high strength and good appearance, including a composition including a propylene polymer, a glass fiber, a modified propylene polymer, and an ethylene/α-random copolymer.

Patent Literature 3 discloses a long fiber-reinforced particle blend including long fiber-reinforced thermoplastic resin particles (A) including a thermoplastic resin produced using a metallocene catalyst, a modified polyolefin resin modified with an unsaturated carboxylic acid and the like, and a reinforcing fiber; and polyolefin resin particles for dilution (B), and it is described that by using this long fiber-reinforced particle blend, an injection-molded product having good opening properties of the reinforcing fiber in an injection cylinder during injection molding, and suppressed floating out of a fiber mass to the surface of the molded product is obtained.

CITATION LIST

Patent Literature

Patent Literature 1: WO 2017/195787 A
Patent Literature 2: WO 2015/002217 A
Patent Literature 3: JP 2010-106262 A

SUMMARY OF INVENTION

Technical Problem

However, the molded product obtained from the conventional fiber-reinforced propylene resin composition has a white haze-like poor appearance on the surface of the molded product (hereinafter, also referred to as "generation of white haze") due to the reinforcing fibers floating out on the surface of the molded product, and thus has room for further improvement.

Thus, an object of the present invention is to provide a reinforcing fiber molded product having excellent appearance and excellent mechanical properties, and to provide a composition suitable for producing such a reinforcing fiber molded product.

Solution to Problem

The summary of the present invention is as follows.

[1]

A long fiber-reinforced propylene resin composition, including a long fiber-reinforced resin pellet; an ethylene polymer (D) that has a density of 865 to 950 kg/m³, a melting point of 50 to 105° C., and a heat of fusion of 52 J/g or more and is optionally modified; and optionally, a propylene polymer (A2), wherein the long fiber-reinforced resin pellet is a pellet including a propylene polymer (A1), a reinforcing fiber (B), and a modified polypropylene (C).

[2]

The long fiber-reinforced propylene resin composition according to the [1], having a content of the ethylene polymer (D) of 3 to 35% by mass.

[3]

The long fiber-reinforced propylene resin composition according to the [1] or [2], further including a carbon black (E), and having a content of the carbon black (E) of 0.4 parts by mass or more relative to 100 parts by mass of the long fiber-reinforced resin pellet.

[4]

The long fiber-reinforced propylene resin composition according to any one of the [1] to [3], satisfying Formula (1) below:

$$5 \leq P_{PP1} + P_{PP2} + P_{mPP} - P_{PE} \leq 60 \tag{1}$$

wherein $P_{PP1}$, $P_{PP2}$, $P_{mPP}$, and $P_{PE}$ are percentages (% by mass) of the propylene polymer (A1), the propylene polymer (A2), the modified polypropylene (C), and the ethylene polymer (D), respectively, based on a total amount of the propylene polymer (A1), the propylene polymer (A2), the reinforcing fiber (B), the modified polypropylene (C), and the ethylene polymer (D).

[5]

The long fiber-reinforced propylene resin composition according to any one of the [1] to [4], satisfying Formula (2) below:

$$25 \leq MFR_{PP+mPP} \leq 500 \tag{2}$$

wherein $MFR_{PP+mPP}$ is represented by Formula (3) below:

$$MFR_{PP+mPP}=10^{\wedge}[(\mathrm{Log}(MFR_{PP1}) \times PP_{PP1}+\mathrm{Log} \\ (MFR_{PP2}) \times PP_{PP2}+\mathrm{Log}(MFR_{mPP}) \times PP_{mPP})/ \\ (PP_{PP1}+PP_{PP2}+PP_{mPP})] \tag{3}$$

wherein $MFR_{PP1}$, $MFR_{PP2}$, and $MFR_{mPP}$ are melt flow rates (g/10 min) of the propylene polymer (A1), the propylene polymer (A2), and the modified polypropylene (C), respectively, measured under a condition of 230° C. and a load of 2.16 kg according to ISO 1133-1, and $PP_{PP1}$, $PP_{PP2}$, and $PP_{mPP}$ are percentages (% by mass) of the propylene polymer (A1), the propylene polymer (A2), and the modified polypropylene (C), respectively, based on a total amount of the propylene polymer (A1), the propylene polymer (A2), the reinforcing fiber (B), the modified polypropylene (C), and the ethylene polymer (D).

[6]

The long fiber-reinforced propylene resin composition according to any one of the [1] to [5], wherein the modified polypropylene (C) has a content of a volatile component derived from a raw material based on a mass of the modified polypropylene (C) of 9000 ppm or less.

[7]

A long fiber-reinforced molded product, including a composition including:

a propylene polymer (A), a reinforcing fiber (B), a modified polypropylene (C), and an ethylene polymer (D) that has a density of 865 to 950 kg/m³, a melting point of 50 to 105° C., and a heat of fusion of 52 J/g or more and is optionally modified.

[8]

The long fiber-reinforced molded product according to the the [7], wherein the composition has a content of the ethylene polymer (D) of 3 to 35% by mass.

[9]

The long fiber-reinforced molded product according to the [7] or [8], wherein the composition further includes a carbon black (E) and has a content of the carbon black (E) of 0.3% by mass or more.

[10]

The long fiber-reinforced molded product according to any one of the [7] to [9], which satisfies Formula (1') below:

$$5 \leq P_{PP}+P_{mPP}-P_{PE} \leq 60 \tag{1'}$$

wherein $P_{PP}$, $P_{mPP}$, and $P_{PE}$ are percentages (% by mass) of the propylene polymer (A), the modified polypropylene (C), and the ethylene polymer (D), respectively, based on a total amount of the propylene polymer (A), the reinforcing fiber (B), the modified polypropylene (C), and the ethylene polymer (D) in the composition.

[11]

The long fiber-reinforced molded product according to any one of the [7] to [10], wherein the modified polypropylene (C) has a content of a volatile component derived from a raw material based on a mass of the modified polypropylene (C) of 9000 ppm or less.

Advantageous Effects of Invention

The long fiber-reinforced molded product of the present invention is particularly excellent in appearance (that is, has suppressed generation of white haze) and also excellent in mechanical properties. Such a long fiber-reinforced molded product can be formed from the long fiber-reinforced propylene resin composition of the present invention.

BRIEF DESCRIPTION OF DRAWINGS

The FIGURE is a schematic diagram of a pellet producing instrument.

DESCRIPTION OF EMBODIMENTS

The present invention will be described in further detail.

[Long Fiber-Reinforced Propylene Resin Composition]

The long fiber-reinforced propylene resin composition according to the present invention includes:

a long fiber-reinforced resin pellet, an ethylene polymer (D), and optionally, a propylene polymer (A2), and the long fiber-reinforced resin pellet is a pellet including a propylene polymer (A1), a reinforcing fiber (B), and a modified polypropylene (C).

<Long Fiber-Reinforced Resin Pellet>

<<Propene Polymer (A1)>>

The propylene polymer (A1) is a polymer containing a structural unit derived from propylene as a main structural unit, and examples thereof include a propylene homopolymer, a propylene/α-olefin random copolymer, and a propylene block copolymer.

Examples of the propylene/α-olefin random copolymer include a random copolymer of propylene and at least one olefin selected from ethylene and α-olefins having 4 to 8 carbon atoms. Examples of the α-olefins include ethylene, 1-butene, 1-pentene, 1-hexene, 4-methyl-1-pentene, 3-methyl-1-pentene, 1-heptene, and 1-octene, preferably include ethylene and 1-butene, and particularly preferably include ethylene. The percentage of the structural unit derived from propylene in the total structural units in the random copolymer is preferably 90% by mol or more, and more preferably 95% by mol or more.

The propylene block copolymer is preferably composed of a propylene homopolymer moiety and a propylene/α-olefin random copolymer moiety. The specific aspect of the propylene/α-olefin random copolymer moiety is the same as the specific aspect of the propylene/α-olefin random copolymer.

When the propylene block copolymer is separated with an n-decane solvent, the propylene block copolymer is separated into a component soluble in n-decane at 23° C. (hereinafter, also referred to as "decane-soluble portion") and a component insoluble in n-decane at 23° C. (hereinafter also referred to as "decane-insoluble portion"). The content of the decane-soluble portion is usually 5 to 30% by mass, preferably 5 to 25% by mass, and more preferably 8 to 18% by mass, and the content of the decane-insoluble portion is usually 70 to 95% by mass, preferably 75 to 95% by mass, and more preferably 82 to 92% by mass.

The melt flow rate (according to ISO 1133-1, 230° C., a load of 2.16 kg) of the propylene polymer (A1) contained in the long fiber-reinforced resin pellet is preferably 20 g/10 min or more, more preferably 30 g/10 min or more, and further preferably 40 g/10 min or more, and the upper limit can be, for example, 300 g/10 min. When the melt flow rate of the propylene polymer (A1) contained in the long fiber-reinforced resin pellet is in this range, the composition of the present invention has fluidity suitable for injection molding.

<<Reinforcing Fiber (B)>>

Examples of the reinforcing fiber (B) include a carbon fiber, a nylon fiber, a cellulose fiber, a basalt fiber, and a glass fiber, and among these, a glass fiber is preferable.

Examples of the glass fiber include filamentous fibers obtained by melt spinning glasses such as E glass (Electrical glass), C glass (Chemical glass), A glass (Alkali glass), S glass (High strength glass), and an alkali resistant glass.

In the present invention, a long glass fiber is usually used as the glass fiber. As a raw material of the long glass fiber, a continuous glass fiber bundle is usually used, which is commercially available as a glass roving. The average fiber diameter is usually 3 to 30 μm, preferably 13 to 20 μm, and further preferably 16 to 18 μm, and the number of filaments in each bundle is usually 400 to 10,000, preferably 1,000 to 6,000, and further preferably 3,000 to 5,000.

As described in JP H6-114830 A, multiple fiber bundles can be bundled and used.

The fiber length of the reinforcing fiber (B) in the long fiber-reinforced resin pellet is usually 4 to 10 mm, and preferably 5 to 8 mm, and the fiber diameter is usually 10 to 20 μm, and preferably 13 to 18 μm.

In the long fiber-reinforced resin pellet, the reinforcing fiber (B) is arranged substantially parallel to the longitudinal direction of the pellet, and the fiber length of the reinforcing fiber (B) is usually substantially the same as the particle length of the pellet (that is, the length of the longitudinal direction of the pellet).

The content of the reinforcing fiber (B) in the long fiber-reinforced resin pellet is preferably 40 to 70% by mass, and more preferably 45 to 60% by mass relative to 100% by mass of the long fiber-reinforced resin pellet. When the content of the reinforcing fiber (B) is not less than the above lower limit, the long fiber-reinforced resin pellet can be produced with good productivity. When the content of the reinforcing fiber (B) is not more than the above upper limit, the fiber bundle of the reinforcing fiber (B) can be sufficiently impregnated with a resin.

Functional groups may be introduced into the surface of the reinforcing fiber (B) by various surface treatment methods such as electrolytic treatment and converging agent treatment. A converging agent is preferably used for the surface treatment, and a converging agent containing a coupling agent is particularly preferably used. When a surface-treated reinforcing fiber (B) is used, the adhesiveness between the reinforcing fiber (B) and the resin component is improved, and a molded product having good strength and appearance is obtained.

Examples of the converging agent include those containing a coupling agent described in JP 2003-253563 A.

Examples of the coupling agent include silane coupling agents such as aminosilane and epoxysilane, and titanium coupling agents.

As the converging agent, in addition to the coupling agent, those containing a resin emulsion for easy handling are also preferable.

Examples of the resin emulsion contained in the converging agent include a urethane emulsion, an olefin emulsion, an acrylic emulsion, a nylon emulsion, a butadiene emulsion, and an epoxy emulsion, and among these, a urethane emulsion or an olefin emulsion is preferable.

<<Modified Polypropylene (C)>>

The modified polypropylene (C) is obtained by acid-modifying polypropylene. Examples of the modification method include conventionally known methods such as graft modification and copolymerization. Examples of the polypropylene to be modified include the propylene polymer (A1).

Examples of the modifier used for the modification include an unsaturated carboxylic acid and a derivative thereof. Examples of the unsaturated carboxylic acid include acrylic acid, methacrylic acid, maleic acid, nadic acid, fumaric acid, itaconic acid, crotonic acid, citraconic acid, sorbic acid, mesaconic acid, angelic acid, and phthalic acid. Examples of the derivative thereof include an acid anhydride, an ester, an amide, an imide, and a metal salt, and specific examples thereof include maleic anhydride, itaconic anhydride, citraconic anhydride, nadic acid anhydride, phthalic anhydride, methyl acrylate, methyl methacrylate, ethyl acrylate, butyl acrylate, monoethyl maleic acid ester, acrylamide, maleic acid monoamide, maleimide, N-butyl-maleimide, sodium acrylate, and sodium methacrylate. Among these, an unsaturated dicarboxylic acid and a derivative thereof are preferable, and maleic anhydride and phthalic anhydride are more preferable.

The amount of the acid added in the modified polypropylene (C), in other words, the percentage of the structure derived from the acid in the modified polypropylene (C) is preferably 0.1 to 14% by weight, and more preferably 0.3 to 8% by weight. The amount of the acid added is determined from the peak area of 1,670 $cm^{-1}$ to 1,810 $cm^{-1}$ obtained by measuring the IR spectrum of the resin.

The polypropylene may be modified prior to the production of the long fiber-reinforced resin pellet, or may be modified in the melt-kneading process during the production of the long fiber-reinforced resin pellet.

When a modifier or volatile components derived from the modifier (hereinafter, these are also collectively referred to as "volatile components") remains in the modified polypropylene (C), fogging may occur on the surface of the molded product formed from the long fiber-reinforced propylene resin composition. Thus, the amount of the volatile components is preferably small, and the content of the volatile components in the modified polypropylene (C) defined by the following formula is preferably 9000 ppm or less, and more preferably 7000 ppm or less. The amount of the volatile components can be reduced by, for example, vacuum drying the modified polypropylene (C).

(Measuring Method of Content of Volatile Components)

The weight of a sample (modified polypropylene (C)) is measured, then the sample is placed in an oven set at a temperature of 240° C., the inside is evacuated by a compressor, and the sample is left to dry for 60 minutes. The weight of the sample after drying is measured, and the content of the volatile components is calculated from the following formula:

$$V_{mPP}=10^6 \times (M_{BF}-M_{AF})/M_{BF}$$

(In the formula, $V_{mPP}$, $M_{BF}$, and $M_{AF}$ are a content of the volatile components (ppm), the weight of the sample before drying, and the weight of the sample after drying, respectively.)

As the modified polypropylene (C), from the viewpoint of improving the affinity between the reinforcing fiber (B) and the propylene polymer (A) and improving the strength or heat resistance of the produced molded product, anhydrous fatty acid-modified polypropylene is preferable, and maleic anhydride-modified polypropylene is particularly preferable.

The amount of the modified polypropylene (C) in the long fiber-reinforced resin pellet is preferably 1 to 5% by mass, and more preferably 1.5 to 3.5% by mass relative to 100% by mass of the long fiber-reinforced resin pellet. When the amount of the modified polypropylene (C) is not less than the above lower limit, the adhesiveness between the reinforcing fiber (B) and the resin component becomes good. When the amount of the modified polypropylene (C) is not more than the above upper limit, the molecular weight of the modified polypropylene (C) does not become too low, and thus, the strength of the molded product produced from the composition of the present invention becomes good.

The melt flow rate (according to ISO 1133-1, 230° C., a load of 2.16 kg) of the modified polypropylene (C) is preferably 50 g/10 min or more, and more preferably 80 g/10 min or more, and the upper limit may be, for example, 1000 g/10 min. When the melt flow rate of the modified polypropylene (C) is in this range, the long fiber-reinforced propylene resin composition of the present invention has fluidity suitable for injection molding.

(Long Fiber-Reinforced Resin Pellet)

The long fiber-reinforced resin pellet contains a propylene polymer (A1), a reinforcing fiber (B), and a modified polypropylene (C).

The shape of the long fiber-reinforced resin pellet is usually columnar.

The particle length (length in the longitudinal direction) of the long fiber-reinforced resin pellet is usually 4 to 10 mm, and preferably 5 to 8 mm. When the particle length of the long fiber-reinforced resin pellet is not less than the above lower limit, the molded product produced from the long fiber-reinforced propylene resin composition of the present invention is excellent in mechanical properties. When the particle length of the long fiber-reinforced resin pellet is not more than the above upper limit, the long fiber-reinforced propylene resin composition of the present invention is excellent in moldability.

In the long fiber-reinforced resin pellet, the reinforcing fiber (B) is usually arranged substantially parallel to the longitudinal direction of the pellet.

Due to the large aspect ratio of the reinforcing fiber (B) in the long fiber-reinforced resin pellet, the molded product formed from the long fiber-reinforced propylene resin composition of the present invention including the long fiber-reinforced resin pellet is excellent in mechanical strength.

The long fiber-reinforced resin pellet can be produced by known molding methods such as pultrusion. Specifically, the long fiber-reinforced resin pellet can be easily obtained by guiding a roving of thousands of the reinforcing fiber (B) to an impregnating die to homogeneously impregnate the roving with a melt of the propylene polymer (A1) and the modified polypropylene (C) (hereinafter, also simply referred to as "molten resin") between filaments, and then cutting it into pieces having a required length.

In this method, for example, while supplying the molten resin from the extruder into the impregnating die provided at the tip of the extruder, a continuous glass fiber bundle is passed through the impregnating die to impregnate the glass fiber bundle with the molten resin, and then the glass fiber bundle is pulled out through a nozzle and pelletized to have a required length.

A method can be also employed in which the propylene polymer (A1), and an unsaturated carboxylic acid or an anhydride thereof are dry blended with an organic peroxide and charged into a hopper of an extruder, and the long fiber-reinforced resin pellet is supplied while simultaneously performing modification.

The method for impregnating the roving of the reinforcing fiber (B) with the molten resin is not particularly limited, and examples thereof include the method described in [0036] of WO 2010/137305 A.

In the process of melting the resin, using an extruder having two or more feed parts, a decomposer may be charged from a top feed and another resin may be charged from a side feed. As the decomposer, an organic peroxide is preferable. Also, using two or more extruders (extruding parts), a decomposer can be charged into at least one of the extruders. Further, a resin, an unsaturated carboxylic acid or a derivative thereof, and a decomposer can be charged to at least one part of the extruders.

<Propylene Polymer (A2)>

The long fiber-reinforced propylene resin composition of the present invention may optionally contain a propylene polymer (A2) in addition to the propylene polymer (A1) contained in the long fiber-reinforced resin pellet.

The propylene polymer (A2) is a polymer containing a structural unit derived from propylene as a main structural unit, and examples thereof include a propylene homopolymer, a propylene/α-olefin random copolymer, and a propylene block copolymer.

Details of the propylene/α-olefin random copolymer and the propylene block copolymer are as described in the section of the propylene polymer (A1).

The melt flow rate of the propylene polymer (A2) (according to ISO 1133-1, 230° C., a load of 2.16 kg) is preferably 10 to 300 g/10 min, more preferably 20 to 250 g/10 min, and further preferably 20 to 200 g/10 min. When the melt flow rate of the propylene polymer (A2) is in this range, the molded product formed from the long fiber-reinforced propylene resin composition of the present invention is excellent in mechanical properties.

Examples of the shape of the propylene polymer (A2) include a powder and a pellet.

<Ethylene Polymer (D)>

The long fiber-reinforced propylene resin composition of the present invention contains an ethylene polymer (D).

The density of the ethylene polymer (D) (according to ISO1183) is 865 to 950 kg/m$^3$, preferably 875 to 930 kg/m$^3$, and more preferably 885 to 910 kg/m$^3$. When the density of the ethylene polymer (D) is within the above range, generation of white haze is suppressed in the molded product of the present invention. Though the reason is not necessarily clear, it is presumably because when the density is low, the transferability of the mold during injection molding becomes good. Meanwhile, when the density of the ethylene polymer (D) is more than 950 kg/m$^3$, generation of white haze may not be suppressed. When the density is less than 865 kg/m$^3$, the rigidity of the molded product of the present invention decreases. When the content is not more than the above upper limit, good mechanical properties of the long fiber-reinforced propylene resin composition of the present invention are maintained.

The melting point of the ethylene polymer (D) measured by DSC (Differential Scanning calorimetry) under the following conditions is 50 to 105° C., preferably 60 to 105° C., and more preferably 70 to 105° C. When the melting point is within the above range, the mold transferability in injection molding is improved, and generation of white haze is suppressed. Meanwhile, when the melting point is more than 105° C., generation of white haze, a problem, is less likely to be suppressed, and when the melting point is excessively less than 50° C., the rigidity of the molded product of the present invention decreases.

The heat of fusion ($\Delta$Hm) of the ethylene polymer (D) measured by DSC (Differential Scanning calorimetry) under the following conditions is 52 J/g or more, and preferably 55 J/g or more. The heat of fusion ($\Delta$Hm) of the ethylene polymer (D) measured by DSC (Differential Scanning calorimetry) under the following conditions is 52 J/g or more, and preferably 55 J/g or more. Though the upper limit is not particularly limited, it is preferably 200 J/g or less, further preferably 125 J/g or less, and particularly preferably 100 J/g or less. When the heat of fusion ($\Delta$Hm) of the ethylene polymer (D) is within the above range, the molded product of the present invention has good mechanical properties and generation of white haze is suppressed. When the ($\Delta$Hm) of the ethylene polymer (D) is less than 52 J/g, the mechanical properties, particularly the bending modulus of the molded product decreases. When the heat of fusion ($\Delta$Hm) of the ethylene polymer (D) is within the above range, the molded product of the present invention has good mechanical properties and generation of white haze is suppressed. When the ($\Delta$Hm) of the ethylene polymer (D) is less than 52 J/g, the mechanical properties, particularly the bending modulus of the molded product decreases.

(Measurement Conditions for DSC)

As a measurement sample, a sheet having a thickness of 200 μm formed from a pellet of an ethylene polymer at 210° C. is used.

Using a differential scanning calorimeter (DSC8500 manufactured by PerkinElmer Co., Ltd.), about 5 mg of the measurement sample is heated from 30° C. to 230° C. at a rate of 500° C./min under a nitrogen atmosphere, held at 230° C. for 10 minutes, then cooled from 230° C. to 30° C. at a rate of 10° C./min, and held at 30° C. for 1 minute. Then, the measurement sample is heated to 230° C. at a rate of 10° C./min, and in the endothermic curve, the temperature at which the endothermic peak is detected is taken as the melting point, and the peak area is taken as the heat of fusion ($\Delta$Hm). When multiple peaks are detected, the temperature of the peak in the highest temperature is taken as the melting point.

Examples of the ethylene polymer (D) include an ethylene homopolymer and an ethylene/$\alpha$-olefin copolymer. The ethylene/$\alpha$-olefin copolymer is, for example, a copolymer of ethylene and one or more $\alpha$-olefins selected from $\alpha$-olefins having 3 to 10 carbon atoms. As $\alpha$-olefins, propylene, 1-butene, 1-hexene, and 1-octene are preferable. One type of $\alpha$-olefins can be used alone, or two or more types can be used in combination.

The ethylene polymer (D) can be a modified ethylene polymer or an unmodified ethylene polymer. Examples of the modification method include conventionally known methods such as graft modification and copolymerization, and for the details of the modification method, the method for producing modified polypropylene above can be referred to.

The melt flow rate of the ethylene polymer (D) (according to ISO 1133-1, 190° C., a load of 2.16 kg) is preferably 0.1 to 50 g/10 min, more preferably 1 to 45 g/10 min, and particularly preferably 1 to 40 g/10 min. When the melt flow rate is not less than the above lower limit, the resin fluidity is unlikely to decrease, dispersion failure during kneading is unlikely to occur, and physical properties such as impact resistance of the molded product are unlikely to decrease. Meanwhile, when the melt flow rate is not more than the above upper limit, the molded product tends to have sufficient impact resistance.

Examples of the shape of the ethylene polymer (D) include a powder and a pellet.

<Carbon Black (E)>

The long fiber-reinforced propylene resin composition of the present invention can include a carbon black (E).

The content of the carbon black (E) is preferably 0.4 parts by mass or more, and more preferably 0.5 parts by mass or more relative to 100 parts by mass of the long fiber-reinforced resin pellet. When the content of the carbon black (E) is within the above range, the reinforcing fiber molded product produced from the long fiber-reinforced propylene resin composition has suppressed generation of white haze, and is excellent in mechanical properties. From the viewpoint of suppressing the carbon black from inhibiting the interfacial adhesion between the reinforcing fiber and the propylene polymer, the content of the carbon black (E) is preferably 1.5 parts by mass or less relative to 100 parts by mass of the long fiber-reinforced resin pellet.

Examples of the carbon black (E) include furnace black, acetylene black, thermal black, and channel black.

<Other Components>

The long fiber-reinforced propylene resin composition of the present invention may contain, in addition to the above components, additives such as a heat-resistant stabilizer, an antistatic agent, a weather-resistant stabilizer, a light-resistant stabilizer, an anti-aging agent, an antioxidant, a copper inhibitor, a fatty acid metal salt, a softener, a dispersant, a filler, a colorant, a pigment, and a foaming agent, as needed, as long as the effect of the present invention is not impaired (for example, at a percentage of 5% by mass or less based on 100% by mass of the composition). These components may be masterbatched.

(Long Fiber-Reinforced Propylene Resin Composition)

The long fiber-reinforced propylene resin composition of the present invention includes the long fiber-reinforced resin pellet and the ethylene polymer (D), and includes the propylene polymer (A2), the carbon black (E), or other components as needed.

The long fiber-reinforced propylene resin composition of the present invention preferably satisfies Formula (1) below, and more preferably satisfies Formula (1a) below:

$$5 \leq P_{PP1} + P_{PP2} + P_{mPP} - P_{PE} \leq 60 \tag{1}$$

$$15 \leq P_{PP1} + P_{PP2} + P_{mPP} - P_{PE} \leq 55 \tag{1a}$$

[In Formulas (1) and (1a), $P_{PP1}$, $P_{PP2}$, $P_{mPP}$, and $P_{PE}$ are percentages (% by mass) of the propylene polymer (A1), the propylene polymer (A2), the modified polypropylene (C), and the ethylene polymer (D), respectively, based on a total amount of the propylene polymer (A1), the propylene polymer (A2), the reinforcing fiber (B), the modified polypropylene (C), and the ethylene polymer (D).]

When $P_{PP1} + P_{PP2} + P_{mPP} - P_{PE}$ is in the above range, a molded product having suppressed generation of white haze and having excellent mechanical properties can be produced.

The content of the reinforcing fiber (B) in the composition of the present invention is preferably 10 to 50% by mass, more preferably 15 to 45% by mass, and further preferably 20 to 40% by mass based on 100% by mass of the composition. When the content of the reinforcing fiber (B) is within the above range, a molded product having suppressed generation of white haze and having excellent mechanical strength can be produced.

The content of the modified polypropylene (C) in the composition of the present invention is preferably 0.5 to 5% by mass, more preferably 0.5 to 4% by mass, and further preferably 1.0 to 3.0% by mass based on 100% by mass of the composition. When the content of the modified polypropylene (C) is in this range, a molded product having excellent mechanical properties can be produced with excellent processability by molding methods such as injection molding.

The content of the ethylene polymer (D) in the composition of the present invention is preferably 3 to 35% by mass, more preferably 5 to 35% by mass, and further preferably 8 to 35% by mass based on 100% by mass of the composition. When the content of the ethylene polymer (D) is within the above range, a molded product having suppressed generation of white haze and having excellent mechanical strength can be produced.

The content of the carbon black (E) in the composition of the present invention is preferably 0.3% by mass or more, and more preferably 0.5% by mass or more based on 100% by mass of the composition. When the content of the carbon black (E) is within the above range, a molded product having suppressed generation of white haze and having excellent mechanical strength can be produced. From the viewpoint of suppressing the carbon black from inhibiting the interfacial adhesion between the reinforcing fiber and the propylene polymer, the content of the carbon black (E) is preferably 1.0% by mass or less based on 100% by mass of the composition.

The composition preferably satisfies Formula (2) below, more preferably satisfies Formula (2a) below, and further preferably satisfies Formula (2b) below:

$$25 \leq MFR_{PP+mPP} \leq 500 \tag{2}$$

$$50 \leq MFR_{PP+mPP} \leq 400 \tag{2a}$$

$$70 \leq MFR_{PP+mPP} \leq 300 \tag{2b}$$

[In Formulas (2), (2a) and (2b), $MFR_{PP+mPP}$ is represented by Formula (3) below:

$$MFR_{PP+mPP}=10^{\wedge}[(Log(MFR_{PP1}) \times PP_{PP1}+Log(MFR_{PP2}) \times PP_{PP2}+Log(MFR_{mPP}) \times PP_{mPP})/(PP_{PP1}+PP_{PP2}+PP_{mPP})] \tag{3}$$

(In Formula (3), $MFR_{PP1}$, $MFR_{PP2}$, and $MFR_{mPP}$ are melt flow rates (g/10 min) of the propylene polymer (A1), the propylene polymer (A2), and the modified polypropylene (C), respectively, measured under a condition of 230° C. and a load of 2.16 kg according to ISO 1133-1.)

$PP_{PP1}$, $PP_{PP2}$, and $PP_{mPP}$ are percentages (%) of the mass of the propylene polymer (A1), the propylene polymer (A2), and the modified polypropylene (C), respectively, based on the total amount (mass) of the propylene polymer (A1), the propylene polymer (A2), the reinforcing fiber (B), the modified polypropylene (C), and the ethylene polymer (D).]

$MFR_{PP+mPP}$ is an index of the melt flow rate of polypropylene resins contained in the long fiber-reinforced propylene resin composition of the present invention as a whole (that is, the propylene polymer (A1), the propylene polymer (A2), and the modified polypropylene (C)). When $MFR_{PP+mPP}$ is in this range, a molded product having excellent mechanical properties can be produced by injection-molding from the composition with good processability.

(Method for Producing Long Fiber-Reinforced Propylene Resin Composition)

The long fiber-reinforced propylene resin composition of the present invention can be produced by mixing, for example, dryblending a long fiber-reinforced resin pellet, an ethylene polymer (D), optionally a propylene polymer (A2), optionally a carbon black (E), and optionally other components.

[Long Fiber-Reinforced Molded Product]

The long fiber-reinforced molded product according to the present invention includes a composition including a propylene polymer (A), a reinforcing fiber (B), a modified polypropylene (C), and an ethylene polymer (D).

The propylene polymer (A) is usually composed of the propylene polymer (A1) and optionally is composed the propylene polymer (A2).

The composition may contain optionally the carbon black (E), and optionally the other components.

Unless otherwise specified, details of the propylene polymer (A1), the propylene polymer (A2), the reinforcing fiber (B), the modified polypropylene (C), the ethylene polymer (D), the carbon black (E), and the other components are as described above. Unless otherwise specified, the content of each component in the composition and its technical significance are also the same as the content of each component in the long fiber-reinforced propylene resin composition of the present invention and its technical significance.

The length of the reinforcing fiber (B) in the molded product of the present invention is usually different from the length of the reinforcing fiber (B) in the long fiber-reinforced propylene resin composition of the present invention. This is because the reinforcing fiber (B) is broken and shortened during molding. The length of the reinforcing fiber (B) in the long fiber-reinforced molded product according to the present invention is usually 0.5 to 5 mm, and preferably 0.8 to 3 mm when the length is expressed as the weight average fiber length calculated based on Formula (4) below after extracting a predetermined number (1000) of reinforcing fibers (B) from the molded product, and measuring the fiber length of each of them.

$$\text{Weight average fiber length}=\Sigma(\text{fiber length})^2/\Sigma \text{ fiber length} \tag{4}$$

The long fiber-reinforced molded product according to the present invention preferably satisfies Formula (1') below, and more preferably satisfies Formula (1a') below.

$$5 \leq P_{PP}+P_{mPP}-P_{PE} \leq 60 \tag{1'}$$

$$15 \leq P_{PP}+P_{mPP}-P_{PE} \leq 55 \tag{1a'}$$

[In Formulas (1') and (1a'), $P_{PP}$, $P_{mPP}$, and $P_{PE}$ are percentages (% by mass) of the propylene polymer (A), the modified polypropylene (C), and the ethylene polymer (D), respectively, based on the total amount of the propylene polymer (A), the reinforcing fiber (B), the modified polypropylene (C), and the ethylene polymer (D).]

When $P_{PP}+P_{mPP}-P_{PE}$ is within the above range, the long fiber-reinforced molded product according to the present invention has suppressed generation of white haze and has excellent mechanical properties.

The long fiber-reinforced molded product according to the present invention can be produced by molding a resin composition including the propylene polymer (A), the reinforcing fiber (B), the modified polypropylene (C), and the ethylene polymer (D), for example, the long fiber-reinforced propylene resin composition according to the present invention.

As the molding method, known molding methods such as injection molding, extrusion molding, hollow molding, compression molding, injection compression molding, gas injection molding, and foam injection molding can be applied without particular limitation. Among these, injection molding, compression molding, and the injection compression molding are particularly preferable, and injection molding is preferable from the viewpoint of producing a molded product having an excellent appearance (that is, having suppressed generation of white haze).

The molded product of the present invention can be suitably used in various fields such as automobile interior/exterior parts and home appliance parts. Examples of the automobile interior/exterior parts include an inner material for a back door.

EXAMPLES

Hereinafter, the present invention will be described in more detail based on Examples, but the present invention is not limited to these Examples.

(Measuring Method)

The measuring method or evaluating method of various physical properties is as follows.

[Melt Flow Rate]

The melt flow rate of the raw material resin was measured under the conditions of the temperature shown in Table 1 and a load of 2.16 kg according to ISO 1133-1.

[$MFR_{PP+mPP}$]

$MFR_{PP+mPP}$ was calculated by Formula (3) above.

[Melting Point and Heat of Fusion ($\Delta Hm$)]

The melting point and heat of fusion were measured using a differential scanning calorimeter. As a sample for measurement, a sheet having a thickness of 200 μm produced using an appropriate amount of pellets at 210° C. was used.

<<Measurement Condition>>

As a measuring instrument, a DSC8500 manufactured by PerkinElmer Co., Ltd. was used.

About 5 mg of the measurement sample was heated from 30° C. to 230° C. at a rate of 500° C./min under a nitrogen atmosphere, held at 230° C. for 10 minutes, then cooled from 230° C. to 30° C. at a rate of 10° C./min, and held at 30° C. for 1 minute. Then, the measurement sample was heated to 230° C. at 10° C./min, and in the endothermic curve, the temperature at which the endothermic peak was detected was taken as the melting point, and the area was taken as the heat of fusion.

[Appearance of Molded Product]

The appearance of the molded product produced in Examples and the like was evaluated according to the following criteria.

○: White haze is barely seen

Δ: Though white haze is seen, it is not easily seen compared to ×

×: White haze is obvious at a glance

[Tensile Failure Stress]

A tensile test was performed to measure a tensile failure stress under the following conditions according to ISO 527.

<<Measurement Condition>>

Temperature: 23° C.

Shape of specimen: ISO-Atype multipurpose specimen

Test speed: 5 mm/min

Distance between grippers: 115 mm

[Bending Strength and Bending Modulus]

The bending strength and bending modulus were measured under the following conditions according to ISO 178.

<<Measurement Condition>>

Temperature: 23° C.

Shape of specimen: 10 mm (width)×4 mm (thickness)×80 mm (length)

Test speed: 5 mm/min

Distance between fulcrums: 64 mm

[Charpy Impact Strength]

A charpy notched impact strength was measured under the following conditions according to ISO 179.

<<Measurement Condition>>

Temperature: 23° C.

Shape of specimen: 10 mm (width)×80 mm (length)×4 mm (thickness)

The notch was machined.

[Content of Volatile Components]

As a sample, 4 g of modified polypropylene was used.

The weight of the sample was measured, then the sample was placed in an oven set at a temperature of 240° C., the inside was evacuated by a compressor, and the sample was left to dry for 60 minutes. The weight of the sample after drying was measured, and the content of the volatile components was calculated from the following formula:

$$V_{mPP}=10^6 \times (M_{BF}-M_{AF})/M_{BF}$$

(In the formula, $V_{mPP}$, $M_{BF}$, and $M_{AF}$ are a content of the volatile components (ppm), the weight of the sample before drying, and the weight of the sample after drying, respectively.)

(Raw Material Used)

The raw materials used in Examples and the like were as follows.

<<Propene Polymer>>

Propylene homopolymers having the following physical properties manufactured by Prime Polymer Co., Ltd. were used.

PP1 (propene homopolymer (MFR (230° C., a load of 2.16 kg)=200 g/10 min)

PP2(propene homopolymer(MFR(230° C., a load of 2.16 kg)=30 g/10 min))

<<Modified Polypropylene>> mPP1 (manufactured by Adivant, trade name: POLYBOND3200 (MFR (230° C., a load of 2.16 kg)=200 g/10 min))

<<Ethylene Polymer>>

PE1 (manufactured by Prime Polymer Co., Ltd., trade name: SP0540, linear low density polyethylene (MFR (190° C., a load of 2.16 kg)=3.8 g/10 min, density=903 kg/m³, melting point=91° C., heat of fusion=72 J/g))

PE2 (manufactured by Prime Polymer Co., Ltd., trade name: SP9046, linear low density polyethylene (MFR (190° C., a load of 2.16 kg)=3.8 g/10 min, density=890 kg/m³, melting point=86° C., heat of fusion=59 J/g))

PE3 (manufactured by Prime Polymer Co., Ltd., trade name: SP0510, linear low density polyethylene (MFR (190° C., a load of 2.16 kg)=1.2 g/10 min, density=903 kg/m³, melting point=91° C., heat of fusion=97 J/g))

PE4 (manufactured by Prime Polymer Co., Ltd., trade name: SP2540, linear low density polyethylene (MFR (190° C., a load of 2.16 kg)=3.8 g/10 min, density=925 kg/m³, melting point=107° C., heat of fusion=128 J/g))

EOR1 (manufactured by Dow, trade name: EG8100, MFR (190° C., a load of 2.16 kg)=1.0 g/10 min, density=871 kg/m³, melting point=63° C., heat of fusion ($\Delta Hm$)=13 J/g)

EOR2 (manufactured by Dow, trade name: EG8402, MFR (190° C., a load of 2.16 kg)=30 g/10 min, density=900 kg/m³, melting point=111° C., heat of fusion ($\Delta Hm$)=78 J/g)

EBR1 (manufactured by Mitsui Chemicals, Inc., trade name: A4090S, MFR (190° C., a load of 2.16 kg)=3.6 g/10 min, density=893 kg/m³, melting point=80° C., heat of fusion ($\Delta Hm$)=47 J/g)

<<Reinforcing Fiber>>

GF (a glass roving in which 4000 of glass fibers having a fiber diameter of 17 μm and surface-treated with aminosilane are bundled, manufactured by Nippon Electric Glass Co., Ltd., trade name: T-431N)

<<Masterbatch (MB) of Carbon Black (CB)>>

MB1 (masterbatch containing 30% by mass of a carbon black, manufactured by TOYOCOLOR CO., LTD., trade name: PPM-01143)

MB2 (masterbatch containing 20% by mass of a carbon black)

MB3 (masterbatch containing 15% by mass of a carbon black)

MB4 (masterbatch containing 22.5% by mass of a carbon black)

MB5 (masterbatch containing 45% by mass of a carbon black)

(Production of Fiber-Reinforced Resin Composition)

Production Example 1

Production of Reinforcing Fiber-Containing Resin

A long fiber-reinforced resin pellet was produced using the pellet producing instrument shown in the FIGURE.

In the FIG. 10 is a die, 20 is an extruder that supplies a molten resin to the die 10, 30 is a roll of fiber bundle F, 40 is a group of tension rolls that gives a constant tension to the fiber bundle F drawn into the die 10, 50 is a cooling means to cool the molten resin impregnated fiber bundle drawn from the die 10, 60 is a drawing roll of the fiber bundle, and 70 is a pelletizer to cut the drawn molten resin impregnated fiber bundle. In this apparatus, three independent fiber bundles F are simultaneously impregnated with a molten resin.

The specific production conditions are as follows.

Die: the die is attached to the tip of a 50 mφ extruder, and four rods are arranged linearly in the impregnating part Fiber bundle: a glass roving in which 4000 of glass fibers having a fiber diameter of 17 μm and surface-treated with aminosilane are bundled, manufactured by Nippon Electric Glass Co., Ltd., trade name: T-431N Preheat temperature: 200° C.

Resin: a mixture of propylene polymer PP1 and maleic anhydride-modified polypropylene mPP1 at a mass ratio of PP1:mPP1=48:2

Melting temperature: 280° C.

Rod: 4 rods, 6 mm (diameter)×3 mm (length)

Under the conditions, the fiber bundle was fed into the die to be impregnated while adjusting the amount of the fiber bundle with the group of tension rolls, then the fiber bundle was drawn out from the die to be cooled, and a long fiber-reinforced resin pellet having a particle length of 8 mm, a reinforcing fiber length of 8 mm, and a content of the reinforcing fiber of 50% by mass was produced by the pelletizer.

Comparative Example 1

A long fiber-reinforced resin composition was prepared by dryblending 60 parts by mass of the long fiber-reinforced resin pellet (hereinafter also referred to as "GFMB") produced in Production Example 1, 40 parts by mass of PP2, and 1 part by mass of MB1.

Then, from this long fiber-reinforced resin composition, various specimens for evaluation of mechanical properties were produced under the following conditions using an injection molding machine, and evaluated.

Injection molding machine: NEX110, manufactured by NISSEI PLASTIC INDUSTRIAL CO., LTD.

Molding temperature: 240° C.

Mold temperature: 40° C.

From this long fiber-reinforced resin composition, a flat plate-shaped molded product was produced under the following conditions using an injection molding machine, and its appearance was evaluated.

Injection molding machine: J110AD, manufactured by The Japan Steel Works, LTD.

Mold: 140 mm×140 mm×3 mm, film gate

Molding temperature: 250° C.

Mold temperature: 45° C.

The evaluation results are shown in Table 1.

Example 1

A long fiber-reinforced resin composition and a molded product thereof were produced in the same manner as in Comparative Example 1 except that 40 parts by mass of PP2 was changed to 20 parts by mass of PP2 and 20 parts by mass of PE1. The evaluation results are shown in Table 1.

Example 2

A long fiber-reinforced resin composition and a molded product thereof were produced in the same manner as in Example 1 except that the amount of PP2 and the amount of PE1 were changed to 30 parts by mass and 10 parts by mass, respectively. The evaluation results are shown in Table 1.

Example 3

A long fiber-reinforced resin composition and a molded product thereof were produced in the same manner as in Example 1 except that the amount of PP2 and the amount of PE1 were changed to 10 parts by mass and 30 parts by mass, respectively. The evaluation results are shown in Table 1.

Example 4

A long fiber-reinforced resin composition and a molded product thereof were produced in the same manner as in Example 1 except that the amount of GFMB was changed to 80 parts by weight, the amount of PE1 was changed to 20 parts by weight, and PP2 was not used. The evaluation results are shown in Table 1.

Example 5

A long fiber-reinforced resin composition and a molded product thereof were produced in the same manner as in Example 1 except that 20 parts by mass of PE1 was changed to 20 parts by mass of PE2. The evaluation results are shown in Table 1.

Example 6

A long fiber-reinforced resin composition and a molded product thereof were produced in the same manner as in Example 1 except that 20 parts by mass of PE1 was changed to 20 parts by mass of PE3. The evaluation results are shown in Table 1.

Comparative Example 2

A long fiber-reinforced resin composition and a molded product thereof were produced in the same manner as in Example 1 except that 20 parts by mass of PE1 was changed to 20 parts by mass of PE4. The evaluation results are shown in Table 1.

Comparative Example 3

A long fiber-reinforced resin composition and a molded product thereof were produced in the same manner as in Example 1 except that 20 parts by mass of PE1 was changed to 20 parts by mass of EOR1. The evaluation results are shown in Table 1.

Comparative Example 4

A long fiber-reinforced resin composition and a molded product thereof were produced in the same manner as in Example 1 except that 20 parts by mass of PE1 was changed to 20 parts by mass of EOR2. The evaluation results are shown in Table 1.

Comparative Example 5

A long fiber-reinforced resin composition and a molded product thereof were produced in the same manner as in Example 1 except that 20 parts by mass of PE1 was changed to 20 parts by mass of EBR1. The evaluation results are shown in Table 1.

Example 7

A long fiber-reinforced resin composition and a molded product thereof were produced in the same manner as in Comparative Example 6 except that the amount of MB2 was changed to 1.5 parts by mass. The evaluation results are shown in Table 1.

Example 8

A long fiber-reinforced resin composition and a molded product thereof were produced in the same manner as in Example 7 except that the amount of MB2 was changed to 3 parts by mass. The evaluation results are shown in Table 1.

Comparative Example 6

A long fiber-reinforced resin composition was prepared by dryblending 80 parts by mass of GFMB, 20 parts by mass of PP2, and 2 parts by mass of MB3. The evaluation results are shown in Table 1.

Example 9

A long fiber-reinforced resin composition and a molded product thereof were produced in the same manner as in Comparative Example 7 except that 20 parts by mass of PP2 was changed to 5 parts by mass of PP2 and 15 parts by mass of PE1. The evaluation results are shown in Table 1.

Example 10

A long fiber-reinforced resin composition and a molded product thereof were produced in the same manner as in Example 9 except that 2 parts by mass of MB3 was changed to 2 parts by mass of MB4. The evaluation results are shown in Table 1.

Example 11

A long fiber-reinforced resin composition and a molded product thereof were produced in the same manner as in Example 9 except that 2 parts by mass of MB3 was changed to 3 parts by mass of MB5. The evaluation results are shown in Table 1.

TABLE 1

| | | MFR (g/10 min) 190° C. | MFR (g/10 min) 230° C. | Density (kg/m³) | Melting point (° C.) | ΔHm (J/g) | Comp. Example 1 | Example 1 | Example 2 | Example 3 | Example 4 | Example 5 | Example 6 | Comp. Example 2 | Comp. Example 3 |
|---|---|---|---|---|---|---|---|---|---|---|---|---|---|---|---|
| Amount contained (Parts by mass) | | | | | | | | | | | | | | | |
| GFMB | GF | — | | | | | 30 | 30 | 30 | 30 | 40 | 30 | 30 | 30 | 30 |
| PP | PP1 | | 200 | | | | | | | | | | | | |
| PP | mPP1 | | 200 | | | | 1.2 | 1.2 | 1.2 | 1.2 | 1.6 | 1.2 | 1.2 | 1.2 | 1.2 |
| PP | PP2 | | 30 | 900 | 163 | 113 | 28.8 | 28.8 | 28.8 | 28.8 | 38.4 | 28.8 | 28.8 | 28.8 | 28.8 |
| PE | PE1 | 3.8 | 7.6 | 903 | 91 | 72 | 40 | 20 | 30 | 10 | 0 | 20 | 20 | 20 | 20 |
| PE | PE2 | 3.8 | | 890 | 86 | 59 | | 20 | 10 | 30 | 20 | | | | |
| PE | PE3 | 1.2 | | 903 | 91 | 97 | | | | | | 20 | | | |
| PE | PE4 | 3.8 | | 925 | 107 | 128 | | | | | | | 20 | | |
| EOR | EOR1 | 1.0 | | 871 | 63 | 13 | | | | | | | | 20 | |
| EOR | EOR2 | 30.0 | | 900 | 111 | 78 | | | | | | | | | 20 |
| EBR | EBR1 | 3.6 | | 893 | 80 | 47 | | | | | | | | | |
| MB of CB | MB1 | | | | | | | | | | | | | | |
| Amount of MB in upper row | MB2 / MB3 / MB4 / MB5 | | | | | | 1 | 1 | 1 | 1 | 1 | 1 | 1 | 1 | 1 |
| Amount of CB in lower row | | | | | | | 0.3 | 0.3 | 0.3 | 0.3 | 0.3 | 0.3 | 0.3 | 0.3 | 0.3 |
| Percentage of amount of CB (parts by mass) (when amount of GFMB is 100 parts by mass) | | | | | | | 0.5 | 0.5 | 0.5 | 0.5 | 0.4 | 0.5 | 0.5 | 0.5 | 0.5 |
| Percentage of amount of CB (when total amount of composition is 100 parts by mass) | | | | | | | 0.3% | 0.3% | 0.3% | 0.3% | 0.3% | 0.3% | 0.3% | 0.3% | 0.3% |
| $P_{PP1} + P_{PP2} + P_{mPP} - P_{PE}$ | | | | | | | 70 | 30 | 50 | 10 | 20 | 30 | 30 | 30 | 30 |
| $MFR_{PP+mPP}$ | | | | | | | 67.6 | 93.6 | 77.5 | 124.5 | 200.0 | 93.6 | 93.6 | 93.6 | 93.6 |
| Evaluation result Appearance | | | | | | | X | ○ | ○ | ○ | ○ | ○ | ○ | Δ | ○ |
| Mechanical properties | Tensile failure strength (23° C., MPa) | | | | | | 115 | 98 | 107 | 90 | 120 | 96 | 104 | 106 | 95 |
| | Bending strength (23° C., MPa) | | | | | | 170 | 148 | 159 | 137 | 180 | 144 | 155 | 155 | 139 |
| | Bending modulus (23° C., MPa) | | | | | | 6805 | 6133 | 6469 | 5797 | 8000 | 5945 | 6362 | 6400 | 5508 |
| | Charpy impact strength (23° C., kJ/m²) | | | | | | 20 | 17 | 19 | 16 | 27 | 17 | 18 | 18 | 20 |

| | | MFR (g/10 min) 190° C. | MFR (g/10 min) 230° C. | Density (kg/m³) | Melting point (° C.) | ΔHm (J/g) | Comp. Example 4 | Comp. Example 5 | Example 7 | Example 8 | Comp. Example 6 | Example 9 | Example 10 | Example 11 |
|---|---|---|---|---|---|---|---|---|---|---|---|---|---|---|
| Amount contained (Parts by mass) | | | | | | | | | | | | | | |
| GFMB | GF | — | | | | | 30 | 30 | 30 | 30 | 40 | 40 | 40 | 40 |
| PP | PP1 | | 200 | | | | | | | | | | | |
| PP | mPP1 | | 200 | | | | 1.2 | 1.2 | 1.2 | 1.2 | 1.6 | 1.6 | 1.6 | 1.6 |
| PP | PP2 | | 30 | 900 | 163 | 113 | 28.8 | 28.8 | 28.8 | 28.8 | 38.4 | 38.4 | 38.4 | 38.4 |
| PE | PE1 | 3.8 | 7.6 | 903 | 91 | 72 | 20 | 20 | 20 | 20 | 20 | 5 | 5 | 5 |
| PE | PE2 | 3.8 | | 890 | 86 | 59 | | | 20 | 20 | | 15 | 15 | 15 |
| PE | PE3 | 1.2 | | 903 | 91 | 97 | | | | | | | | |
| PE | PE4 | 3.8 | | 925 | 107 | 128 | | | | | | | | |
| EOR | EOR1 | 1.0 | | 871 | 63 | 13 | | 20 | | | | | | |
| EOR | EOR2 | 30.0 | | 900 | 111 | 78 | 20 | | | | | | | |

TABLE 1-continued

| | | | | | | | | | |
|---|---|---|---|---|---|---|---|---|---|
| EBR | EBR1 | 3.6 | | | | | | | |
| MB of CB | MB1 | 893 | | | | | | | |
| Amount of MB in upper row | MB2 | 80 | | | | | | | |
| | MB3 | | 47 | 1.5 / 0.3 | 3 / 0.6 | | | | |
| Amount of CB in lower row | MB4 | | | | | 2 / 0.3 | 2 / 0.3 | 2 / 0.45 | 3 / 0.9 |
| | MB5 | 1 / 0.3 | 20 / 1 / 0.3 | | | | | | |
| Percentage of amount of CB (parts by mass) (when amount of GFMB is 100 parts by mass) | | 0.5 | 0.5 | 0.5 | 1.0 | 0.4 | 0.4 | 0.6 | 1.1 |
| Percentage of amount of CB (when total amount of composition is 100 parts by mass) | | 0.3% | 0.3% | 0.3% | 0.6% | 0.3% | 0.3% | 0.5% | 0.9% |
| $P_{PP1} + P_{PP2} + P_{mPP} - P_{PE}$ | | 30 | 92 | 30 | 30 | 60 | 30 | 30 | 30 |
| $MFR_{PP+mPP}$ | | 93.6 | 93.6 | 93.6 | 93.6 | 106.3 | 162.0 | 162.0 | 162.0 |
| Evaluation result | Appearance | △ | ○ | ○ | ○ | X | ○ | ○ | ⊙ |
| | Mechanical properties Tensile failure strength (23° C., MPa) | 96 | 92 | 148 | 140 | 150 | 132 | 133 | 130 |
| | Bending strength (23° C., MPa) | 141 | 135 | | | 195 | 184 | 184 | 175 |
| | Bending modulus (23° C., MPa) | 5700 | 5500 | 6230 | 5972 | 8600 | 8200 | 8334 | 7860 |
| | Charpy impact strength (23° C., kJ/m²) | 18 | 17 | | | 32 | 34 | 30 | 31 |

REFERENCE SIGNS LIST

10 Die
20 Extruder
30 Roll of fiber bundle F
40 Group of tension rolls
50 Cooling means
60 Drawing roll
70 Pelletizer

The invention claimed is:

1. A long fiber-reinforced propylene resin composition, comprising:

a long fiber-reinforced resin pellet;

an ethylene polymer (D) that has a density of 865 to 950 $kg/m^3$, a melting point of 50 to 105° C., and a heat of fusion of 52 J/g or more and is optionally modified;

a carbon black (E); and optionally, a propylene polymer (A2), wherein the long fiber-reinforced resin pellet is a pellet comprising a propylene polymer (A1), a reinforcing fiber (B), and a modified polypropylene (C).

2. The long fiber-reinforced propylene resin composition according to claim 1, having a content of the ethylene polymer (D) of 3 to 35% by mass based on the 100% by mass of the composition.

3. The long fiber-reinforced propylene resin composition according to claim 1, having a content of the carbon black (E) of 0.4 parts by mass or more relative to 100 parts by mass of the long fiber-reinforced resin pellet.

4. The long fiber-reinforced propylene resin composition according to claim 1, satisfying Formula (1) below:

$$5 \leq P_{PP1} + P_{PP2} + P_{mPP} - P_{PE} \leq 60 \qquad (1)$$

wherein $P_{PP1}$, $P_{PP2}$, $P_{mPP}$, and $P_{PE}$ are percentages by mass of the propylene polymer (A1), the propylene polymer (A2), the modified polypropylene (C), and the ethylene polymer (D), respectively, based on a total amount of the propylene polymer (A1), the propylene polymer (A2), the reinforcing fiber (B), the modified polypropylene (C), and the ethylene polymer (D).

5. The long fiber-reinforced propylene resin composition according to claim 1, satisfying Formula (2) below:

$$25 \leq MFR_{PP+mPP} \leq 500 \qquad (2)$$

wherein $MFR_{PP+mPP}$ is represented by Formula (3) below:

$$MFR_{PP+mPP} = 10^{\{[(Log(MFR_{PP1}) \times PP_{PP1} + Log(MFR_{PP2}) \times PP_{PP2} + Log(MFR_{mPP}) \times PP_{mPP})/(PP_{PP1} + PP_{PP2} + PP_{mPP})]\}} \qquad (3)$$

wherein $MFR_{PP1}$, $MFR_{PP2}$, and $MFR_{mPP}$ are melt flow rates (g/10 min) of the propylene polymer (A1), the propylene polymer (A2), and the modified polypropylene (C), respectively, measured under a condition of 230° C. and a load of 2.16 kg according to ISO 1133-1, and $PP_{PP1}$, $PP_{PP2}$, and $PP_{mPP}$ are percentages by mass of the propylene polymer (A1), the propylene polymer (A2), and the modified polypropylene (C), respectively, based on a total amount of the propylene polymer (A1), the propylene polymer (A2), the reinforcing fiber (B), the modified polypropylene (C), and the ethylene polymer (D).

6. The long fiber-reinforced propylene resin composition according to claim 1, wherein the modified polypropylene (C) has a content of a volatile component derived from a raw material based on a mass of the modified polypropylene (C) of 9000 ppm or less.

7. A long fiber-reinforced molded product, comprising a composition comprising:

a propylene polymer (A), a reinforcing fiber (B), a modified polypropylene (C), a carbon black (E), and an ethylene polymer (D) that has a density of 865 to 950 $kg/m^3$, a melting point of 50 to 105° C., and a heat of fusion of 52 J/g or more and is optionally modified.

8. The long fiber-reinforced molded product according to claim 7, wherein the composition has a content of the ethylene polymer (D) of 3 to 35% by mass based on the 100% by mass of the composition.

9. The long fiber-reinforced molded product according to claim 7, wherein the composition has a content of the carbon black (E) of 0.3% by mass or more based on the 100% by mass of the composition.

10. The long fiber-reinforced molded product according to claim 7, which satisfies Formula (1') below:

$$5 \leq P_{PP} + P_{mPP} - P_{PE} \leq 60 \qquad (1')$$

wherein $P_{PP}$, $P_{mPP}$, and $P_{PE}$ are percentages by mass of the propylene polymer (A), the modified polypropylene (C), and the ethylene polymer (D), respectively, based on a total amount of the propylene polymer (A), the reinforcing fiber (B), the modified polypropylene (C), and the ethylene polymer (D) in the composition.

11. The long fiber-reinforced molded product according to claim 7, wherein the modified polypropylene (C) has a content of a volatile component derived from a raw material based on a mass of the modified polypropylene (C) of 9000 ppm or less.

* * * * *